Figure 1:
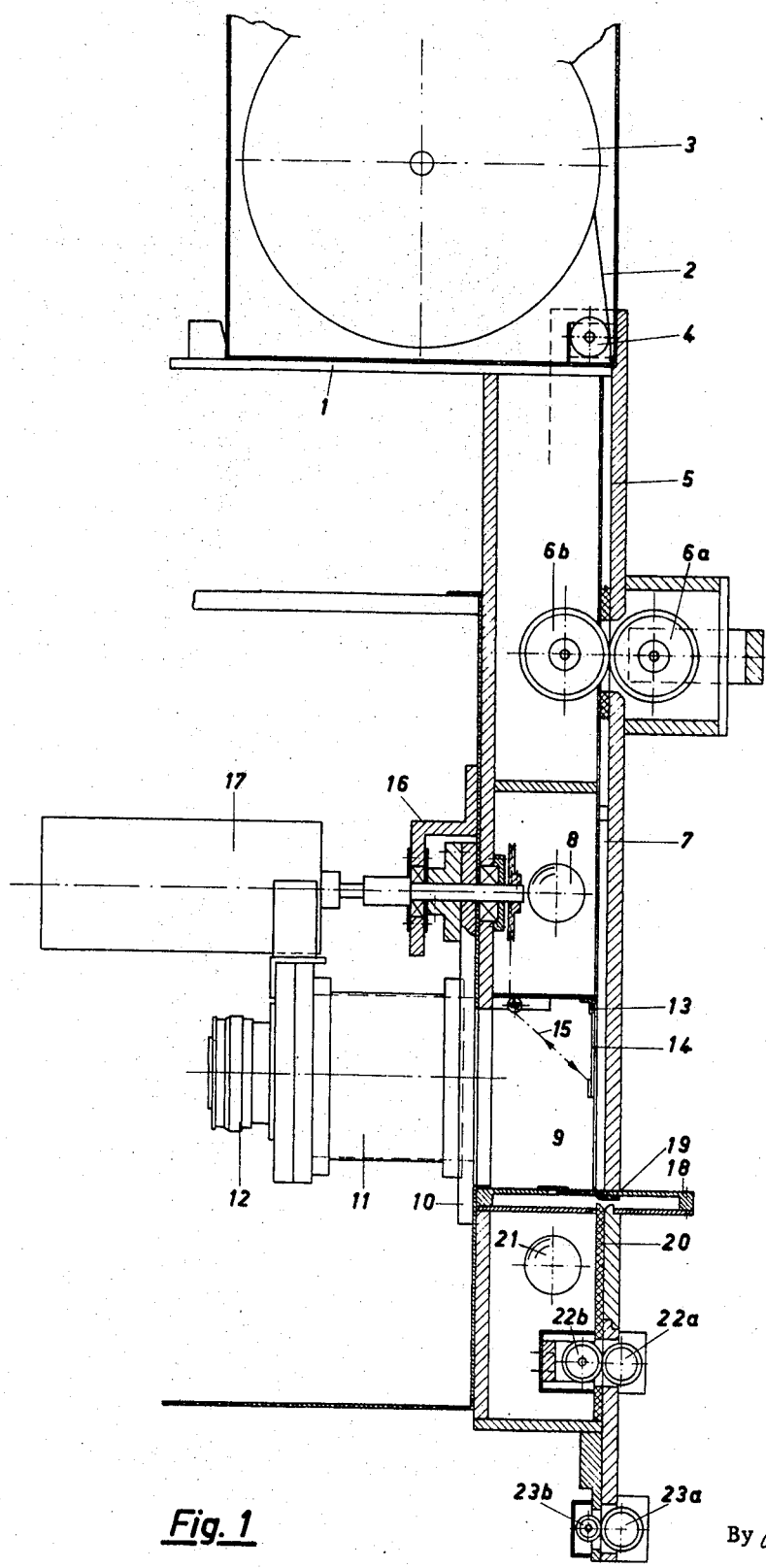

United States Patent

[11] 3,593,634

[72] Inventor Emil Guntersweiler
 Zurich, Switzerland
[21] Appl. No. 782,827
[22] Filed Dec. 11, 1968
[45] Patented July 20, 1971
[73] Assignee Elektro-Watt, Elektrische, Und Industrielle
 Unternehmungen A.G.
 Zurich, Switzerland
[32] Priority Dec. 22, 1967
[33] Switzerland
[31] 18,217/67

[54] APPARATUS FOR MAKING A LARGE-FORMAT PHOTOGRAPH OR A NUMBER OF SMALL-FORMAT PHOTOGRAPHS WITH THE SAME TOTAL SURFACE AREA
 4 Claims, 3 Drawing Figs.
[52] U.S. Cl................................................ 95/18,
 95/1.1, 355/46
[51] Int. Cl............................................G03b 19/00
[50] Field of Search........................... 95/18, 1.1;
 355/46, 54

[56] References Cited
UNITED STATES PATENTS
3,169,441 2/1965 Johnson .................... 355/54 X
3,401,594 9/1968 Daugherty................... 355/46

Primary Examiner—John M. Horan
Attorney—Abraham A. Saffitz

ABSTRACT: The present invention relates to the optional production either of a large-format photograph or of a number of small-format photographs with the same total surface area and the apparatus therefor. An object to be photographed is used to produce optionally either a large-format picture by way of a plain light deflection element and a lens of long focal length or a number of smaller picture in a single take by way of at least two light deflection elements arranged at an angle to one another and a lens of short focal length. The two lenses and the light deflection elements thereby are pivoted selectively in front of a photographic device.

APPARATUS FOR MAKING A LARGE-FORMAT PHOTOGRAPH OR A NUMBER OF SMALL-FORMAT PHOTOGRAPHS WITH THE SAME TOTAL SURFACE AREA

Devices already exist by means of which it is possible to produce optionally one large-format or a number, usually four, of small-format photographs. They are often installed in booths and take the form of coin-operated automatic machines. These existing devices feature two rigidly mounted object lenses, one with a long focal length for the taking of large-format portrait photographs and the other with a shorter focal length for the taking of four small-format passport-type photographs.

The pictures are produced on negative material in strip form, the four passport-type pictures covering together the same surface area as one portrait. In order to utilize the negative material available to the full, an arrangement is made in respect of the passport-type pictures under which two pictures at a time are positioned next to one another and the two pairs of pictures are located one above the other.

Now if it is desired to produce four such passport-type photographs, where the object lens is mounted rigidly it will be necessary to provide for a threefold displacement of the negative material following the first take. Assuming that the first picture to be taken is located top left, the negative material must then be moved to the left by an amount corresponding to the width of the picture. The top right picture is then exposed and after a displacement upwards by an amount corresponding to the height of the picture the bottom right picture is taken. Lastly, after a final displacement to the right, the bottom left picture is produced. These displacements demand an expensive control mechanism and cause a not inconsiderable complication of the entire installation. In addition, the displacement movements take up a great deal of time and increase the sensitivity of the installation to breakdown.

The object of the present invention is to eliminate these disadvantages and to suggest a process for producing optionally either a single large-format photograph or a number of small-format photographs with the same total surface area. The process is characterized by the fact that an object to be photographed is used to produce optionally either a large-format picture by way of a plane light deflection element and an object lens with long focal length or a number of smaller pictures in a single take by way of at least two light deflection elements arranged at an angle to one another and an object lens with short focal length, the two object lenses and the light deflection elements being pivoted selectively on front of a photographic device.

The invention additionally relates to an apparatus for the application of the process described, embodying a magazine for negative material in strip form a feeder mechanism for the negative material, a device for severing the exposed film from the negative material, a photographic device with object lens and a device for margin exposure.

The apparatus is characterized by the fact that there are mounted on a pivotable object lens mounting plate one object lens with short focal length and one with long focal length which can optionally be pivoted in front of the photographic device, a plane light deflection element being arranged in front of the object lens with long focal length and connected rigidly with it, while at least two light deflection elements arranged at an angle to one another are mounted in front of the photographic device in such manner that they take up a position within range of the object lens with short focal length when the latter is pivoted in front of the photographic device.

Figure 2:
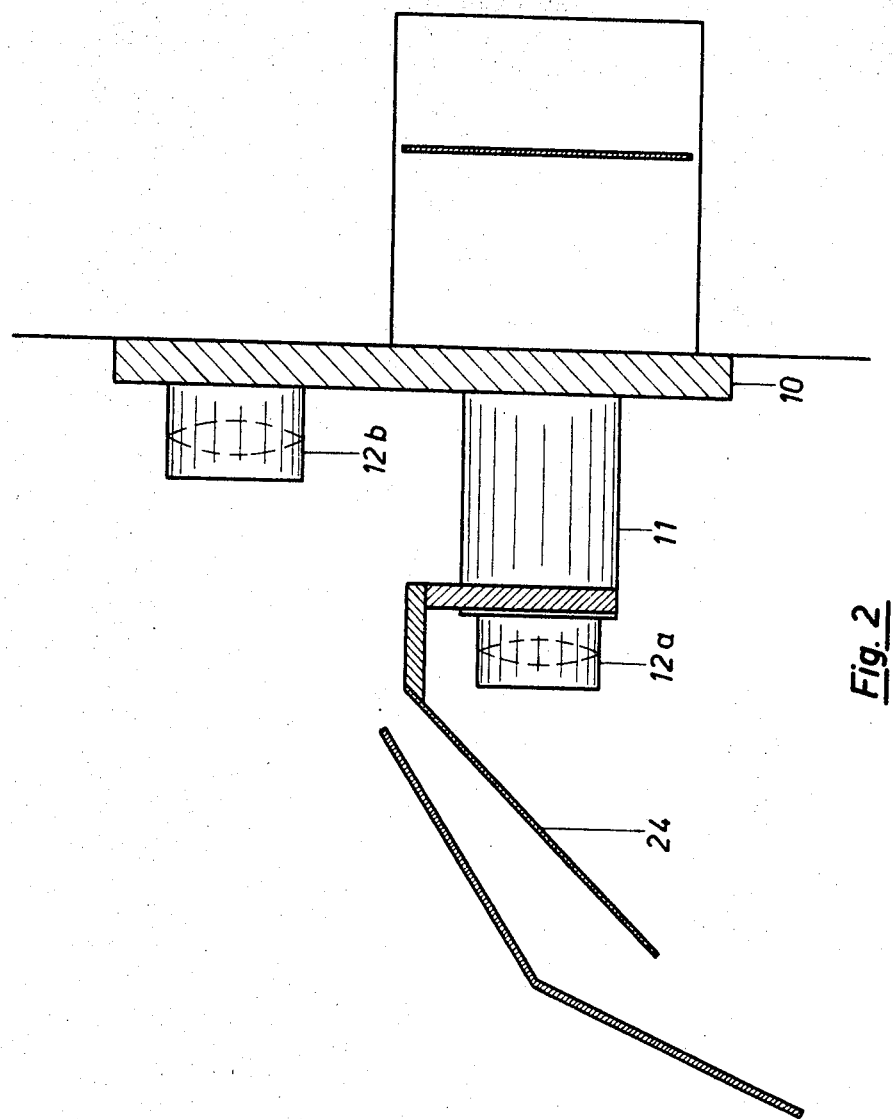
Figure 3:
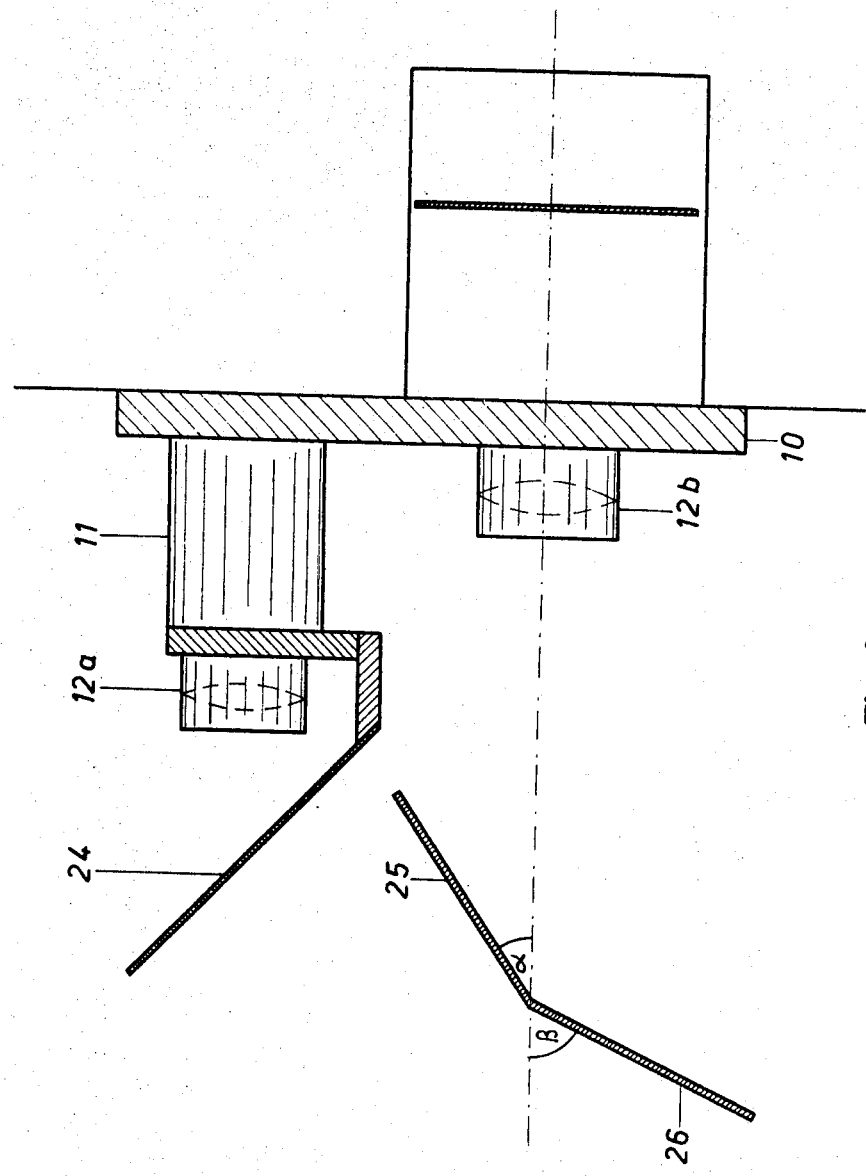

The attached drawings illustrate one example of the execution of the proposed apparatus, namely:

FIG. 1 shows a vertical section through the apparatus,
FIG. 2 shows a diagrammatic view of the object lenses and light deflection elements (in the position for a portrait take),
FIG. 3 shows the same as FIG. 2, but in the position for passport-type pictures.

FIG. 1 shows an exemplary version of the apparatus in vertical section. At 1 is a magazine containing a reel 3 on which the negative material in strip form 2 is reeled. The negative material 2 is fed into the film channel 5 by way of an idler reel 4. Two feeder reels 6a and 6b, one of which is power driven, effect the onward feed of the negative material. The two feeder reels are provided for preference with a rubber coating along their circumferential surfaces and are pressed against the negative material under spring loading.

An initial device for margin exposure is mounted below the feeder reels 6a and 6b. It consists of a mast 7 and a lamp 8. The mask 7 consists of a light diffusing screen and a plate provided with an aperture in the shape of a rectangular frame.

The initial margin exposure device is followed by the turret 9. This embodies an object lens mounting plate 10, a tube 11 with a holder 12 for an object lens 12a of long focal length and an object lens of short focal length 12b (FIGS. 2 and 3). Additionally present is a drop flap 14 mounted to pivot about the shaft 13 and actuated by a pull cord 15.

The object lens mounting plate 10 is designed to pivot and is actuated by a power device 16 and a motor 17. The same power device 16 also serves the pull cord 15 to the drop flap 14.

When the object lens mounting plate 10 is in one of its terminal positions, the object lens 12a of long focal length is in position for a take (FIGS. 1 and 2), and in the other terminal position the object lens 12b of short focal length is in position (FIG. 3).

Directly following the photographic section 9 there is provided a severing device 18 embodying a blade 19.

The lower extremity of the entire apparatus is formed by a second margin exposure device which again embodies a mask 20 and a lamp 21, the mask 20 consisting of a diffusion screen and a plate with an aperture in the form of a cross.

Additional guide and feeder reels 22a, 22b, 23a and 23b ensure that the negative material runs efficiently.

If, then, it is desired to produce a portrait picture with the apparatus described above, the following takes place: unexposed negative material 2 is fed from the magazine 1 into the film guide channel 5 and conveyed onwards as far as the initial margin exposure device. Utilizing the mask 7 and the lamp 8, a frame is here exposed on the negative material in the size of the picture to be taken. The onward transfer of the negative material then continues until such time as the frame just exposed has taken up a position exactly behind the photographic section 9. The motor 17 is now started and the power unit 16 pivots the object lens mounting plate 10 in such manner that the object lens of long focal length 12a is located in a position of readiness in front of the photographic section. At the same time the cord 15 is reeled in, so that the drop flap 14 is pivoted upward to clear the entire area of the portion to be exposed. Exposure with the object to be photographed is effected by way of a plane mirror 24 (FIG. 2) mounted at an angle of 45° in front of the object lens 12a and rigidly connected to it. As a result a true-sided picture is obtained, as the photographic process that follows involves inversion treatment of the negative material.

When exposure has been carried out, the negative material is moved onward, halts for a brief period to enable the exposed portion to be severed by the severing device 18 with its blade 19, and finally proceeds to a developing device of conventional design.

In the production of four smaller passport-type pictures the following takes place:

After unexposed negative material 2 has been introduced from the magazine 1 into the film channel 5, it is conveyed onward as far as the initial margin exposure device where a frame is exposed and then proceeds into the photographic section 9. Thereupon the motor 17 is set in motion and the power unit 16 pivots the object lens mounting plate 10 until the object lens 12b of short focal length is located in the readiness position in front of the photographic section (FIG. 3).

At the same time the cord 15 is reeled out and the drop flap 14 pivots into its lowered position as illustrated in FIG. 1. Exposure of that half of the negative material not masked by the drop flap 14 is now effected, the method being that the object lens 12b simultaneously delineates two images of the object to be photographed by means of two mirrors 25 and 26 angled to one another at an obtuse angle of approx. 175°. The mirror 25 makes an angle $\alpha$ of approx. 42.5° with the axis of the object lens and the mirror 26 an angle $\beta$ of approx. 47.5° with the same axis (FIG. 3).

Following the exposure of the first two pictures, the negative material is moved on downwards by an amount corresponding to the height of one picture and a second exposure takes place.

By consequence, four pictures arranged in a quadrilateral are obtained.

Following the second exposure, feed is continued until the exposed portion is located behind the second margin exposure device. Here a cruciform margin is produced to ensure clear distinction between the individual pictures. At the same time the severing device 18 is actuated and the completely exposed portion of the negative material is moved onwards for further processing in a developing installation operating on the inversion principle.

The individual operations are for preference controlled by an electrical control apparatus.

The apparatus described is particularly suitable for utilization in coin-operated automatic machines in which either one large-format or a number of small-format photographs can optionally be produced.

By reason of the fact that it is unnecessary for the entire feeder mechanism to be displaced, the apparatus operates very quickly, reliably and accurately.

A modification of the apparatus to produce for example nine or 16 smaller pictures can be carried out very rapidly and simply, as it is only necessary to alter the setting of the control system and to change the object lens 12b, the drop flap 14 and the mirror system 25, 26.

Similarly, the apparatus is suitable both for color and black-and-white photographs, as the margin exposure is carried out from the coated side of the negative material and not from the reverse side as has hitherto been the custom and which would lead to color distortion.

What I claim is:

1. Apparatus for making either a single large-format photograph or a number of small-format photographs with a total surface area which is the same as that of the large single photograph comprising:
   a. a magazine for dispensing a strip of unexposed negative material from a feeding station to an exposing station;
   b. a feeder mechanism which moves the negative material toward the exposing station from the dispensing magazine and away from the exposing station to the outlet;
   c. exposing means mounted at the exposing station between the dispensing magazine and the outlet;
   d. said exposing means comprising a turret holder having a pivotable object lens mounting plate with a holder for two object lenses, one of long focal length and one of short focal length, at least two light deflection elements arranged at an angle to each other, a drop flap masking means, shaft and pull cord mechanism to pivotably move either the long focal length object lens or the short focal length object lens into exposing position for the negative material; and,
   e. motor means for moving the pull cord and drop flap and for pivoting the lens mounting plate, whereby the movement of the short focal length lens in relation to said light deflection elements provides the number of small format photographs.

2. Apparatus as claimed in claim 1, wherein said drop flap masking means includes a mask for framing the aperture in the shape of a rectangular frame.

3. Apparatus as claimed in claim 1, wherein the object lens of long focal length is connected rigidly to a light deflection element which consists of a plane mirror mounted at an angle of 45° to the axis of said object lens.

4. Apparatus as claimed in claim 1, wherein said light deflection elements consist of two plane mirrors mounted with their common edges intersecting the axis of the object lens of short focal length to enclose an obtuse angle.